(12) United States Patent
Callaway, Jr. et al.

(10) Patent No.: US 6,519,275 B2
(45) Date of Patent: Feb. 11, 2003

(54) COMMUNICATIONS SYSTEM EMPLOYING DIFFERENTIAL ORTHOGONAL MODULATION

(75) Inventors: Edgar H. Callaway, Jr., Boca Raton, FL (US); Neiyer S. Correal, Cooper City, FL (US); Paul E. Gorday, West Palm Beach, FL (US); Frederick L. Martin, Plantation, FL (US); Qicai Shi, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/022,942

(22) Filed: Dec. 18, 2001

(65) Prior Publication Data

US 2003/0012259 A1 Jan. 16, 2003

Related U.S. Application Data

(60) Provisional application No. 60/302,164, filed on Jun. 29, 2001.

(51) Int. Cl.[7] ............................................. H04B 1/707
(52) U.S. Cl. ..................... 375/140; 375/145; 375/149; 375/150
(58) Field of Search ................................. 375/140, 141, 375/142, 145, 146, 149, 150

(56) References Cited

U.S. PATENT DOCUMENTS

| 6,064,695 | A | * | 5/2000 | Raphaeli ..................... 375/135 |
| 6,108,317 | A | * | 8/2000 | Jones et al. ................. 370/320 |
| 6,198,763 | B1 | * | 3/2001 | Inoue et al. ................ 375/130 |
| 6,212,219 | B1 | | 4/2001 | Shou et al. |
| 6,366,603 | B1 | * | 4/2002 | Uchida et al. .............. 375/136 |

* cited by examiner

*Primary Examiner*—Don N Vo
(74) *Attorney, Agent, or Firm*—Andrew Fuller

(57) ABSTRACT

A system and method for orthogonal modulation of signals in communication systems. In the transmitter, differentially coded symbols are used to select time-shifted code sequences. The timing, or code position, of a code sequence is determined at the receiver by comparison to the previous code from the same channel, thus eliminating the need for dual-channel transmission and eliminating error due to differences in path propagation time. A fixed preamble code is also used to synchronize the receiver.

16 Claims, 14 Drawing Sheets

COMMUNICATIONS SYSTEM EMPLOYING DIFFERENTIAL ORTHOGONAL MODULATION

CROSS REFERENCE TO RELATED APPLICATIONS

This application claims the benefit of U.S. Provisional Application No. 60/302,164 filed Jun. 29, 2001 and assigned to Motorola, Inc.

CROSS REFERENCE TO RELATED DOCUMENTS

This application is related to pending application Ser. No. 09/803,258 filed Mar. 9, 2001 for System for Spread Spectrum Communication, and to pending application Ser. No. 09/716,837 filed Nov. 20, 2000, Method and Apparatus for Synchronizing a DS/CDMA receiver. These applications are hereby incorporated by reference.

TECHNICAL FIELD

The invention relates to the field of communication systems, and in particular to direct sequence spread spectrum systems utilizing differential orthogonal modulation.

BACKGROUND OF THE INVENTION

Modulation of radio signals using direct sequence spread-spectrum codes is a widely used technique in communications systems. The advantage of the technique is that multiple signals can share the same frequency space, or channel, without interference.

In a typical DSSS communications system, data units (typically binary) are represented by codes, where each code is itself a sequence of 1 s and 0s. The code sequences are selected from a special class of sequences known as pseudo-noise (PN) sequences, which have the properties of low self correlation and low cross correlation with other codes. At the receiver, the binary data is recovered by correlating the received data with a set of desired codes. Signals applied to the receiver that are not encoded with the desired PN codes are not correlated. The action of the correlator allows a desired PN-coded signal to be received in the presence of stronger uncorrelated signals. The gain associated with the correlation process (spreading gain) is proportional to the length of the code (in chips, or binary elements).

The most common application of DSSS communications systems is to facilitate multiple access, or multiple transmissions sharing the same frequency space, location space and time. However, if multiple access is not the goal, it is possible to use DSSS as a means of increasing the data rate in a given channel compared to traditional means. It is this concept that is the focus of the present invention.

Use of orthogonal codes as a modulating means is a concept that has been discussed in U.S. Pat. No. 6,212,219 B1 and in U.S. patent application Ser. No. 09/803,258. In the concept as presented in these references, data is coded in a multi-bit format using multiple PN codes. The concept is extended through the use of time shifts on the codes. Codes are selected such that they are orthogonal (zero cross correlation for all times), thus enabling the time shifted codes to be used as modulating elements.

As an example of the power of this method, consider the case of a binary data stream modulating a carrier with one of 4 orthogonal codes, each with 16 possible time shifts. If a symbol is defined as a single instance of an orthogonal code sequence, it can be seen that 6 bits (4 codes, each with 16 possible time shifts) can be represented by each symbol. This is a 6× improvement in throughput over traditional DSSS modulation. Furthermore, because the codes are orthogonal, the increase in signal power required to overcome channel noise is less than 2 dB higher than is required for the single bit case. This is a large improvement over traditional DSSS modulation, where a 6× increase in bit rate would result in a 10*log(6)=7.5 dB increase in required transmit power to achieve a given signal to noise ratio.

As the above example demonstrates, orthogonal modulation methods are powerful for achieving high energy efficiency in transmission. One of the motivations of this invention is to capture this advantage.

A key limitation in existing schemes is in the way that time-shifted versions of codes are recognized. Related art proposes the use of a quadrature modulation scheme, where the I-channel is used as a time reference and a Q-channel is used to transmit data. Time shifted code sequences are recognized by comparing the start of the reference code sequence on the I-channel with the start of a data code sequence on the Q-channel. This approach, while workable, has two disadvantages:

1) Two channels are utilized but only one channel carries data. The result is that maximum bit rate of the channel is reduced by a factor of 2.
2) Timing of sequence shifts on the Q-channel depends on identical propagation times of the I and Q channels. If this is not the case, errors result.

Accordingly, there is need for a communications system that maximizes the bit rate for a given bandwidth and sensitivity by allowing single-channel transmission, allowing quadrature systems with data on both I and Q channels (2× capacity improvement), and eliminating the need for timing between I and Q channels.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
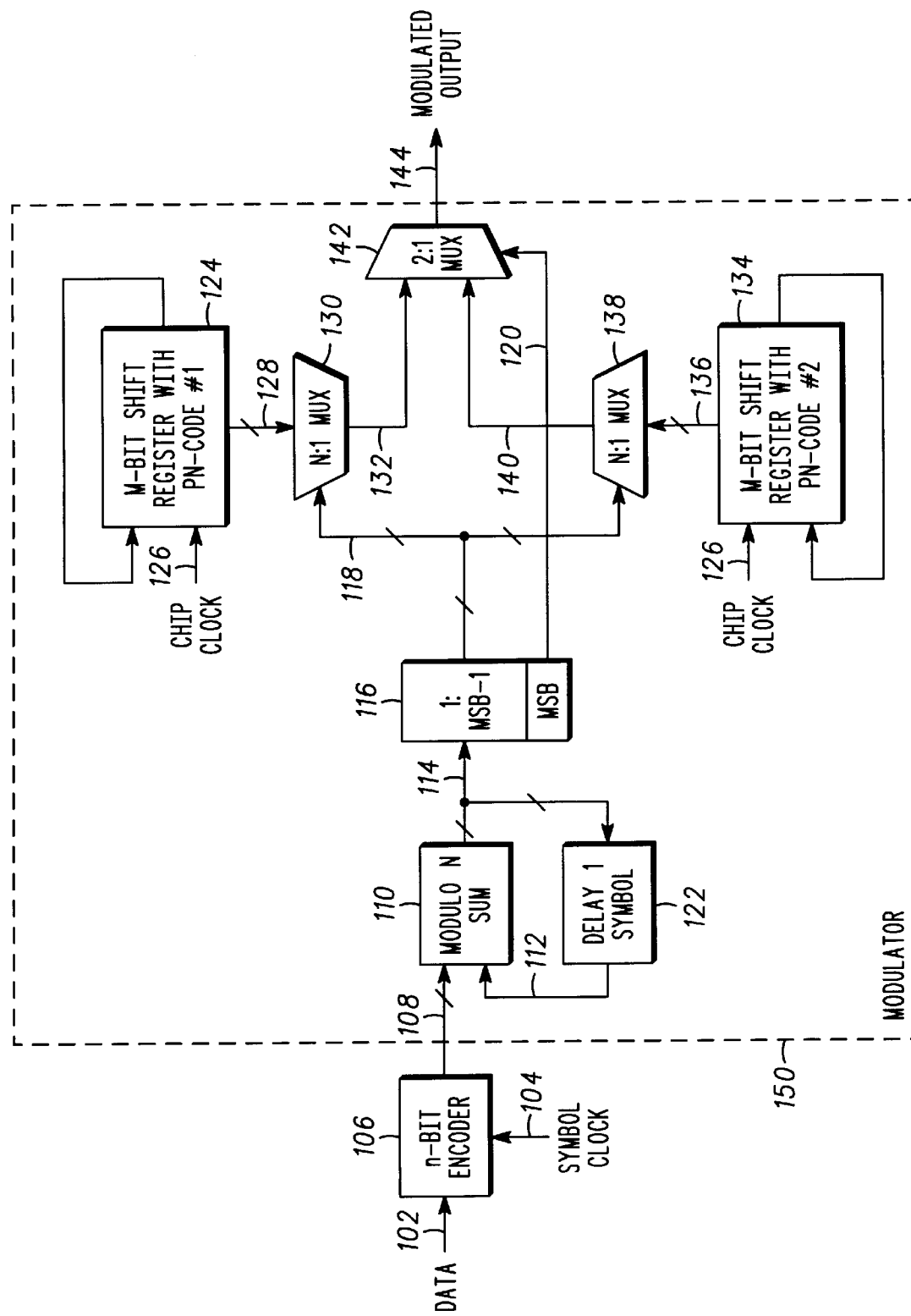
FIG. 1 is a block diagram of a single-channel transmission circuit of one embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The invention employs an orthogonal modulation scheme that realizes the benefits of the orthogonal modulation scheme described above while eliminating the limitations of the prior art. The improvement is achieved by employing differential coding of the time-shifted code sequences used in the modulation scheme. This allows the timing, or code position, of a code sequence to be determined at the receiver by comparison to the previous code from the same channel, thus eliminating the need for dual-channel transmission and eliminating error due to differences in path propagation time. Conversely, the second channel, if available, can be used for data transmission, thus increasing the system bit rate by a factor of 2.

Referring now to FIG. 1, a single-channel transmitter is illustrated. The transmitter consists of an n-bit encoder 106 that converts the data input 102 (typically a binary serial stream at bit rate Rb) to a series of n-bit words 108 at symbol rate Rs=Rb/n. Timing information 104 is provided by a symbol clock. The n-bit word is then modulated onto a carrier using the circuitry in the block 150 designated as "modulator".

In the modulator 150, the n-bit word 108 is encoded at 110 using modulo-N arithmetic, then mapped to a PN code sequence and code position. In general, the encoder is a differential encoder, so called because the information is represented as the difference between successive encoded symbols. In the embodiment shown, the encoding is achieved by adding the n-bit word 108 to the previously encoded word 112 in summer 110. The summer uses modulo-N arithmetic, where N=2^n. The output 114 from the summer is passed to delay unit 122, where it is delayed by one symbol period to produce the delayed symbol 112. In FIG. 1, two codes are used, each with length M. M is greater than or equal to N and is preferably related to N by M=kN where k is a positive non-zero integer.

The code sequences and their shifted variants can be generated and or stored by several means. In the figure, the codes are stored in circular shift registers 124 and 134 and shifted through the register serially in response to a chip clock 126 at rate Rc, where Rc=M*Rs. Multiplexors 130 and 138 on each register allow one of N (preferably) equally spaced outputs, 128 and 136, of the registers to be selected. This selection action produces the code-shift portion of the modulation.

The selection criterion is based on the output of the differential encoder 110. The least significant bits 118 of the encoder are selected by bit-selector 116 and are used to provide the select input to the multiplexors 130 and 138 at the circular register outputs 128 and 136. The most significant bit 120 (or bits, if more than 2 codes are employed) of the output 114 is selected by bit selector 116 and acts as the select input to a second mulitplexor 142 that selects the correct code from the outputs 132 and 140 of the multiplexors 130 and 138. In this manner, the output of the differential encoder is mapped into a set of orthogonal codes and produces the modulated output 144.

Figure 2:
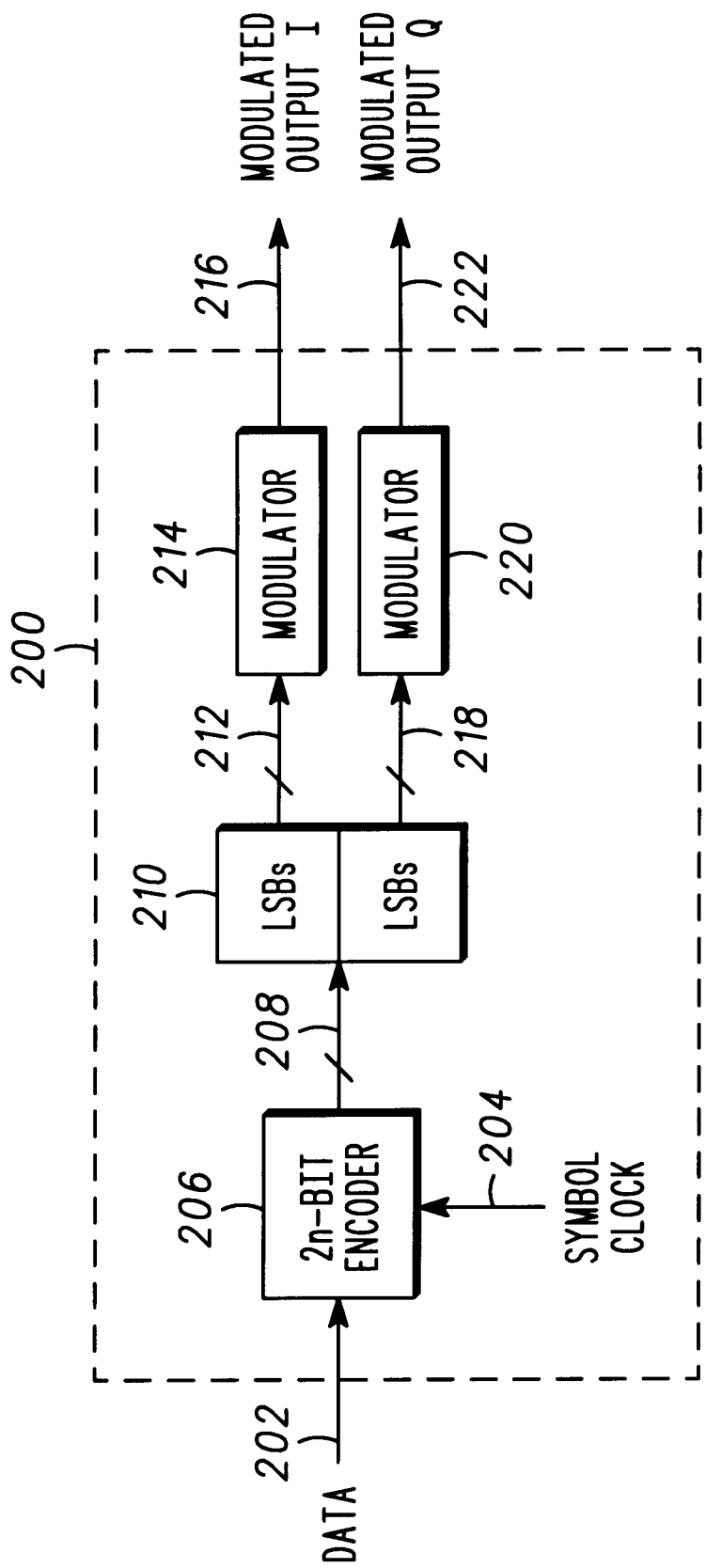
FIG. 2 is a block diagram of a two-channel modulation circuit of one embodiment of the present invention.

The method can be extended to quadrature or multi-channel transmission schemes. FIG. 2 illustrates a quadrature (2-channel) modulator 200. In this embodiment, the data rate is increased by 2-times compared to the example of FIG. 1. An encoder 206 of 2*n bits is employed to format the data 202 for modulation. This produces encoded output 208. Bit selector 210 selects the n least significant bits (LSB) 212 of the encoded data word and the n most significant bits (MSB) 218 of the encoded data word. Two modulators 214 and 220 are used, with the encoder output bits split between the two modulators. Two data output channels 216 and 222, labeled I and Q, are generated.

In many wireless communications systems, transmissions are not continuous but are divided into individual transmissions, or packets. To facilitate synchronization of a receiver to the received signals, a preamble, a signal of known characteristics, is used at the beginning of each transmission. While this preamble could take many forms, a preferred method in this invention is to use a separate PN sequence, unmodulated, as a preamble.

Figure 3:
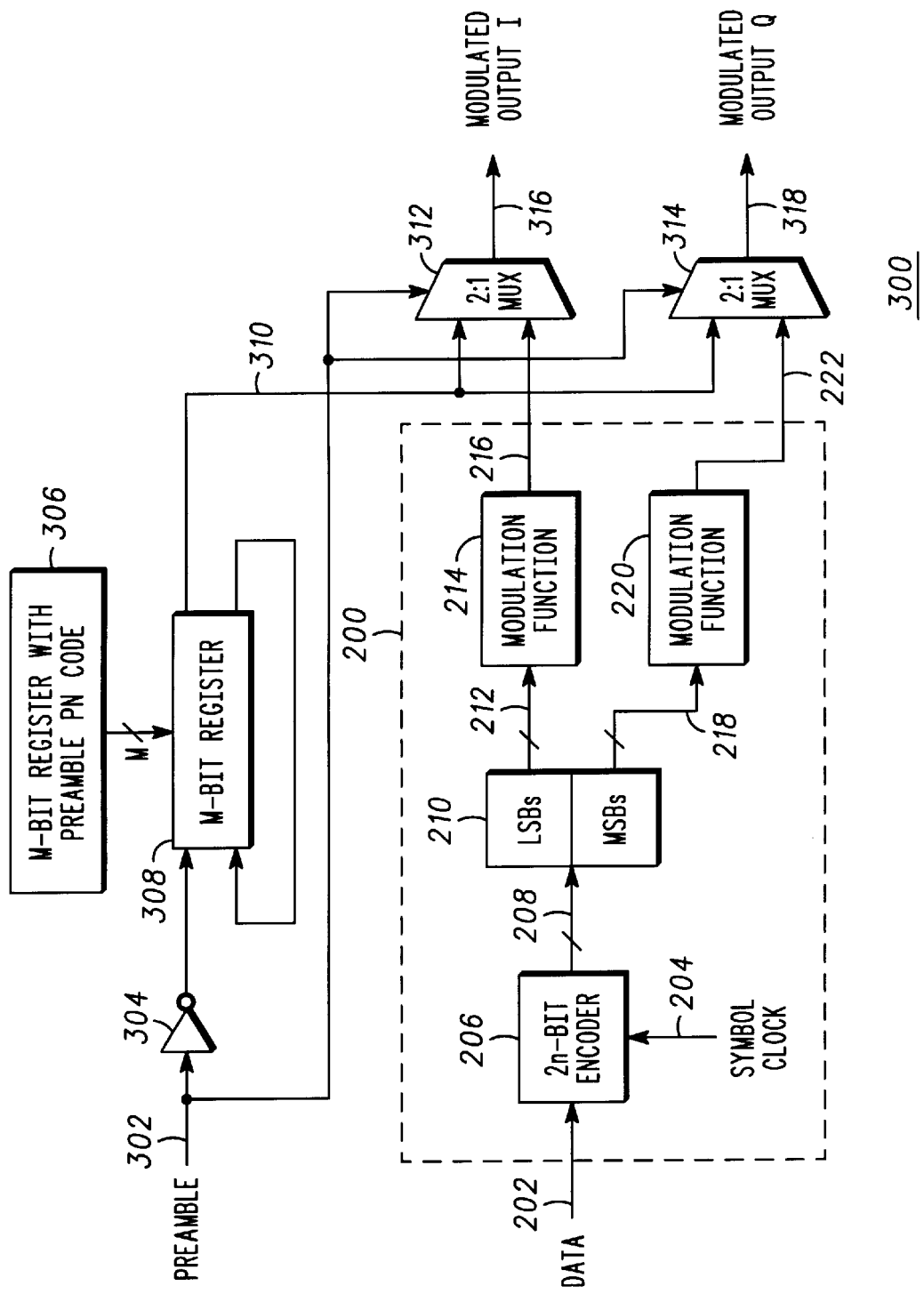
FIG. 3 is a block diagram of a system for generating a preamble code according to one embodiment of the present invention.

A system for generating a preamble according to the invention is shown in FIG. 3. As shown in the figure, the system comprises the dual-channel modulator 200 of FIG. 2 along with additional circuitry for producing a preamble. The additional circuitry includes an M-bit register 306 for storing a preamble PN sequence (preferably distinct from the PN sequences used for modulation), an M-bit shift register 308 clocked from the chip clock and having a load function, and multiplexors 312 and 314 on both the I and Q outputs of the modulator for combining the preamble code sequences 310 with the modulated data signals 216 and 222. The circuit is controlled by an externally generated PREAMBLE control signal 302 which asserts at the beginning of the preamble and returns to zero at the end of the preamble. Preferably, the preamble control input is generated by a microcomputer or state machine which maintains its high state for an integer number of cycles of the preamble codes and times inputs on the data input line to coincide with the end of the preamble signal. The PREAMBLE control signal 302 is passed through inverter 304 to generate a control signal for the M-bit register 308.

Note that while FIG. 3 addresses the case of a preamble with a dual-channel system, the approach could be applied to any number of channels. In a multi-channel system a different preamble sequence may also be used in each of the channels.

Figure 4:
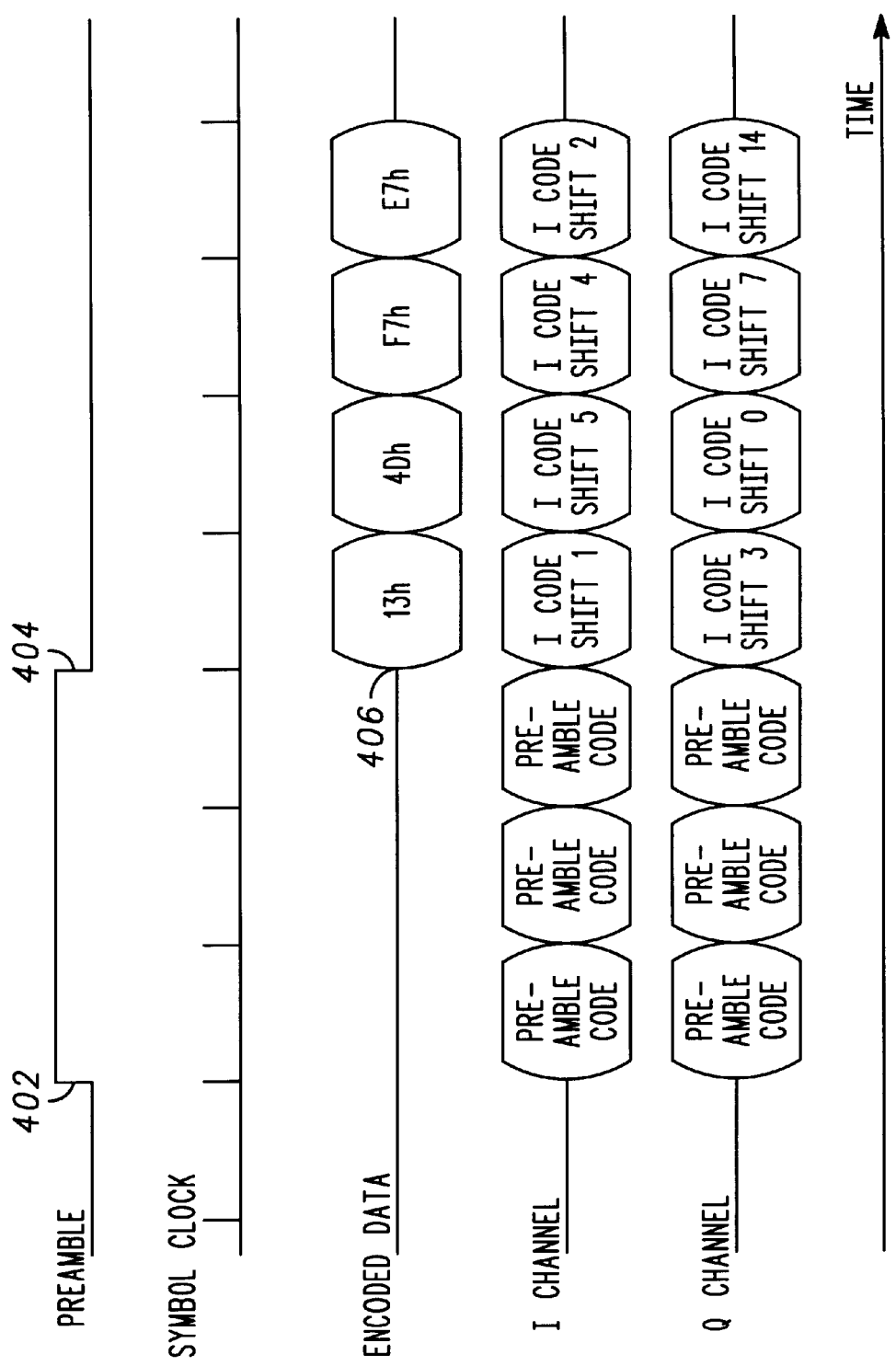
FIG. 4 is a timing diagram showing waveforms produced by an exemplary system of the present invention.

An example of the waveforms produced by a typical system according to the invention is shown in FIG. 4. For this case, a two-channel I/Q modulation system is employed.

Each channel is coded with a single PN code sequence. The number of bits per symbol is 8, where 4 bits per symbol are coded on each channel.

The transmission in the example comprises 3 preamble symbols and 4 data symbols. The preamble symbol begins when control input PREAMBLE transitions are high 402. Both the high transition 402 and the low transition 404 of the PREAMBLE input are synchronized to the SYMBOL CLOCK so that the preamble length is an integer multiple of the length of PN sequences used in the system. Data transmission begins at the end of the preamble 404. The beginning of data transmission 406 into the encoder is (preferably) synchronized to the end of preamble 404. The input to the encoder is labeled as ENCODED DATA in the figure. The output of the encoder is shown in the figure as I CHANNEL and Q CHANNEL. The high order 4 bits of the data word at the encoder output (expressed in hexadecimal in the figure) are mapped to the I channel. The low order 4 bits are mapped to the Q channel. The first data symbol in each channel is coded differentially against an implicit 00 code for the last preamble symbol. After that, differential coding of the data is applied using modulo-16 arithmetic.

The operation of the PN codes is shown in more detail in the table below. In this example, the sequence of bits on the I-channel is shown for the example presented in FIG. 4. For the preamble sequence and base I-channel code sequence shown in table, actual bit sequences are shown in for each symbol. Note that each data symbol is a circularly shifted version of the base I-channel code sequence. The preamble sequence is 0100111110001010, and the PN code sequence for the I-channel is 1110101010101000.

TABLE 1

| I-CHANNEL SYMBOL | CODED BITS |
|---|---|
| PREAMBLE | 0100111110001010 |
| PREAMBLE | 0100111110001010 |
| PREAMBLE | 0100111110001010 |
| I CODE SHIFT 1 (DATA) | 0111010101010100 |
| I CODE SHIFT 5 (DATA) | 1000111010101010 |
| I CODE SHIFT 4 (DATA) | 0100011101010101 |
| I CODE SHIFT 2 (DATA) | 0011101010101010 |

Figure 5:
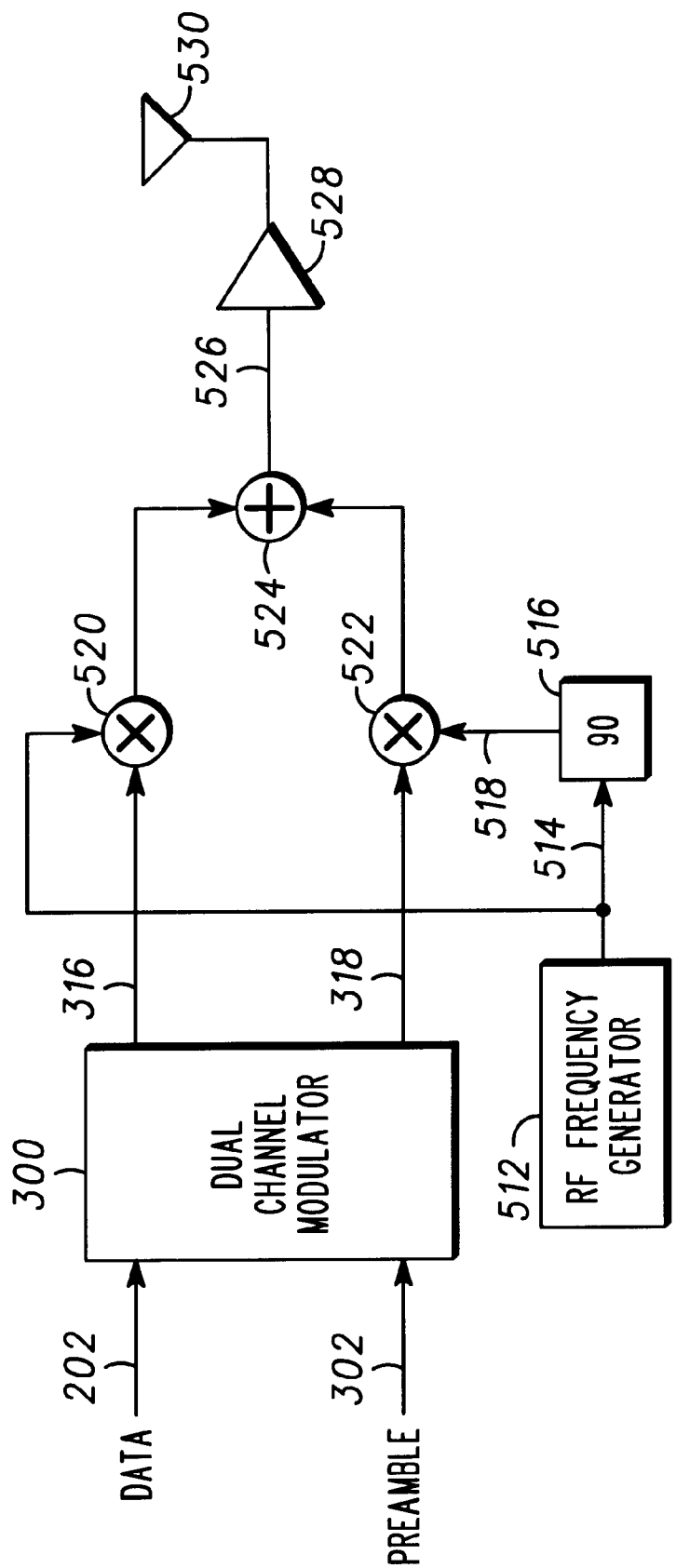
FIG. 5 is a block diagram of a quadrature modulated transmitter of one embodiment of the present invention.

The primary application of this invention will likely be as a means of modulating an RF carrier. A typical application of the invention used in this context is shown in FIG. 5. In the example, a dual-channel modulator 300 according to the invention is used in a quadrature modulated transmitter with carrier frequency fc. The RF modulation process consists of multiplying the modulator outputs 316 and 318 by the appropriate version of the quadrature carrier signal of frequency fc. The resulting products are summed, amplified in a power amplifier (PA) and coupled to an antenna for wireless transmission.

The block diagram in FIG. 5 is one of many possible ways to create an RF carrier with modulation characteristics according to the invention. Data sequence 202 and preamble sequence 302 are input the dual channel modulator 300, to produce modulated outputs 316 and 318. RF frequency generator 512 produces an in-phase carrier signal 514 at a specified carrier frequency, fc. The carrier signal 514 is shifted in phase by 90° at phase shifter 516 to produce quadrature carrier signal 518. The in-phase carrier signal 514 and the I channel modulated signal are multiplied at 520 to produce the I-component of the transmission signal. The quadrature carrier signal 518 and the Q channel modulated signal are multiplied at 522 to produce the Q-component of the transmission signal. The I- and Q- components are added at 524 to produce signal 526, which is then amplified by power amplifier 528 and passed to radio antenna 530 for transmission.

Figure 6:
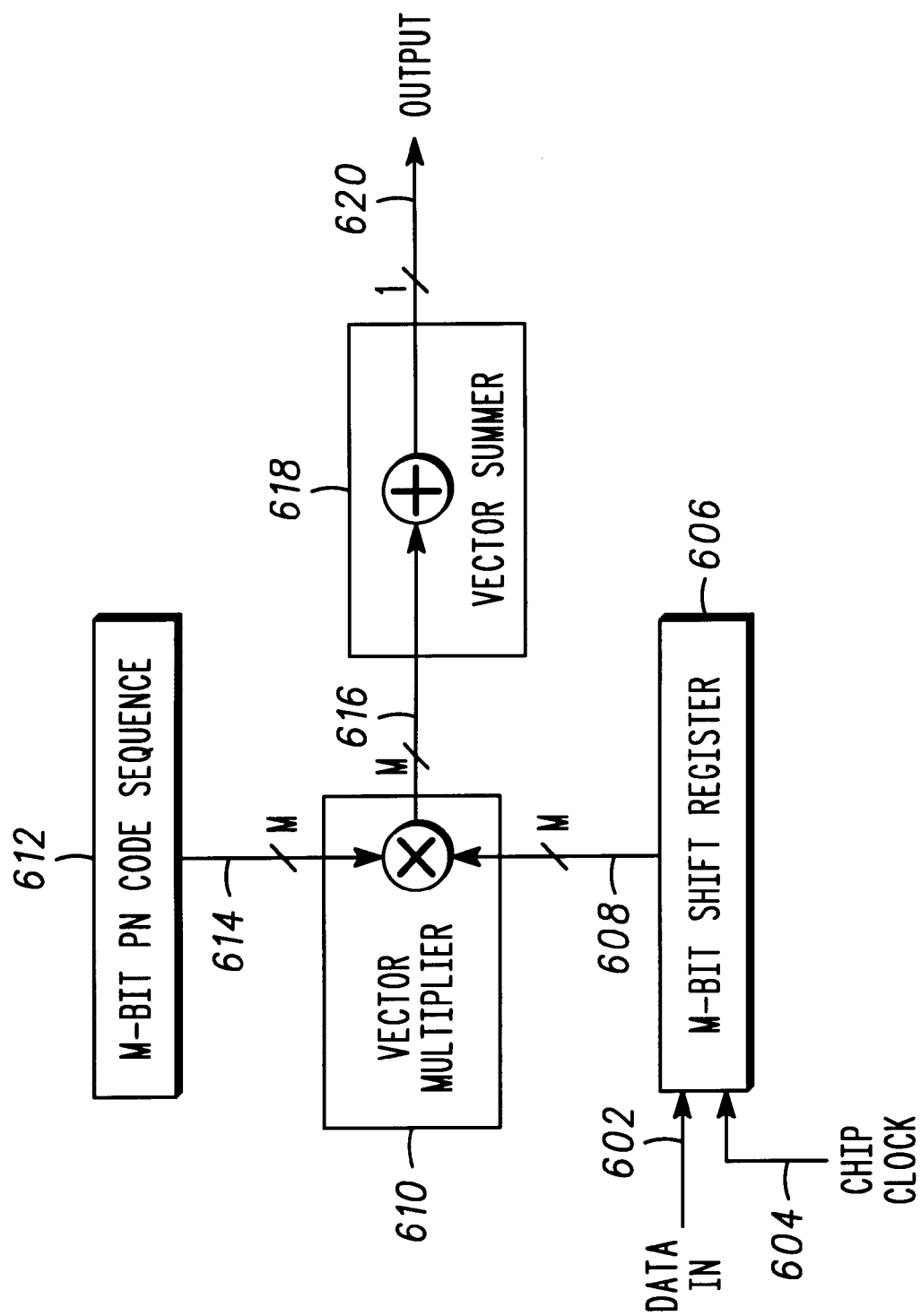
FIG. 6 is a block diagram of an M-bit correlator of one embodiment of the present invention.

The corresponding receiver portion of the communication system will now be described. In the receiver, modulation is removed and the original data is recovered. The fundamental operation in the receiver is correlation. A simple M-sample correlator is shown in FIG. 6. In the correlator, received data 602 is stored in a M-bit shift register 606. Data 608 is obtained by successively shifting values through the shift register 606 at the chip clock rate Rc. The chip clock is supplied at 604. A fixed M-bit code is stored in register 612. A vector multiplication of the M-bit code 614 and the data 608 is performed by vector multiplier 610. The resulting vector elements 616 are summed in vector summer 618 to a single value at the correlator output 620. Perfect correlation is achieved when the contents of the shift register are identical to the elements of the code sequence. For ideal noiseless operation, this results in an output of M*A, where A is the amplitude of the data input. The additive nature of noise causes variations of the correlator outputs. However, the value of output should in general be higher for the correlated condition than for the uncorrelated condition.

In a further embodiment of the correlator of FIG. 6, oversampling of the correlator is accomplished by repeating each PN code sequence value K times, where K is the oversampling rate. The total length of the shift register in the oversampled correlator is M*K.

Figure 7:
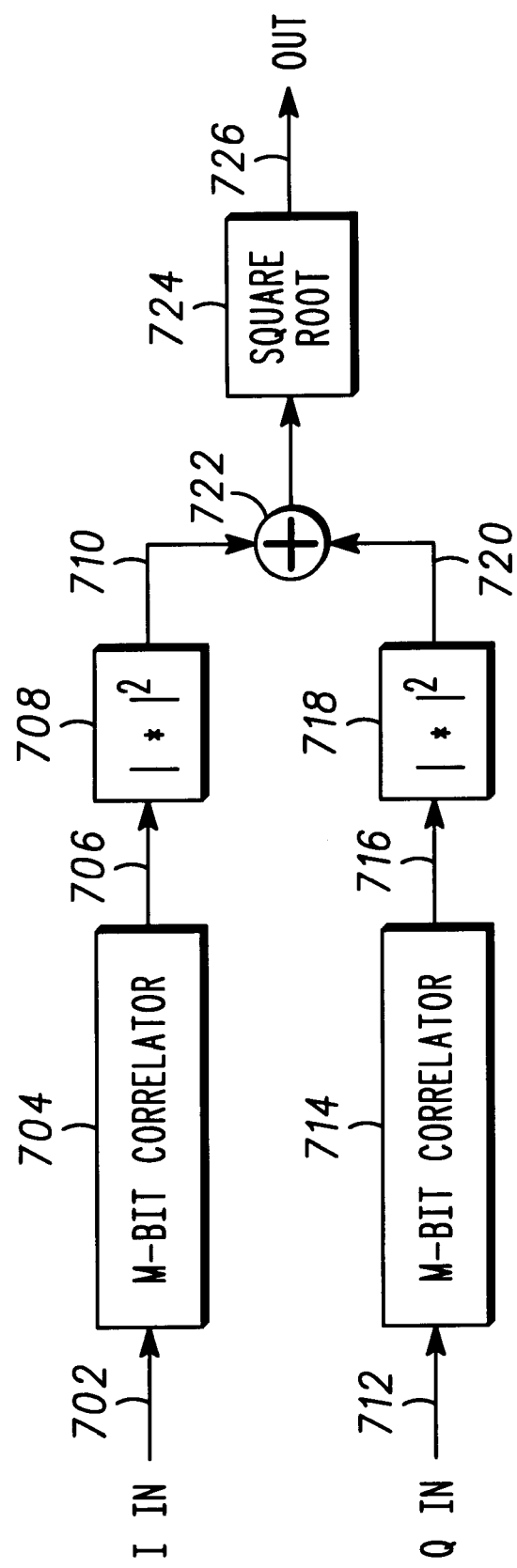
FIG. 7 is a block diagram of a complex correlator of one embodiment of the present invention.

The phase of the receiver input is, in general, unknown, so it is necessary to perform non-coherent detection on the input signal to the receiver. This operation is shown in FIG. 7. The non-coherent correlation detector comprises two simple correlators 704 and 714, one for the I-channel receiver input 702 and one for the Q-channel receiver input 712. The correlator output 706 is squared at module 708 to produce output 710. The correlator output 716 is squared at module 718 to produce output 720. The outputs 710 and 720 are added at 722 and the square root is taken 724 to produce the RMS output 726.

Figure 8:
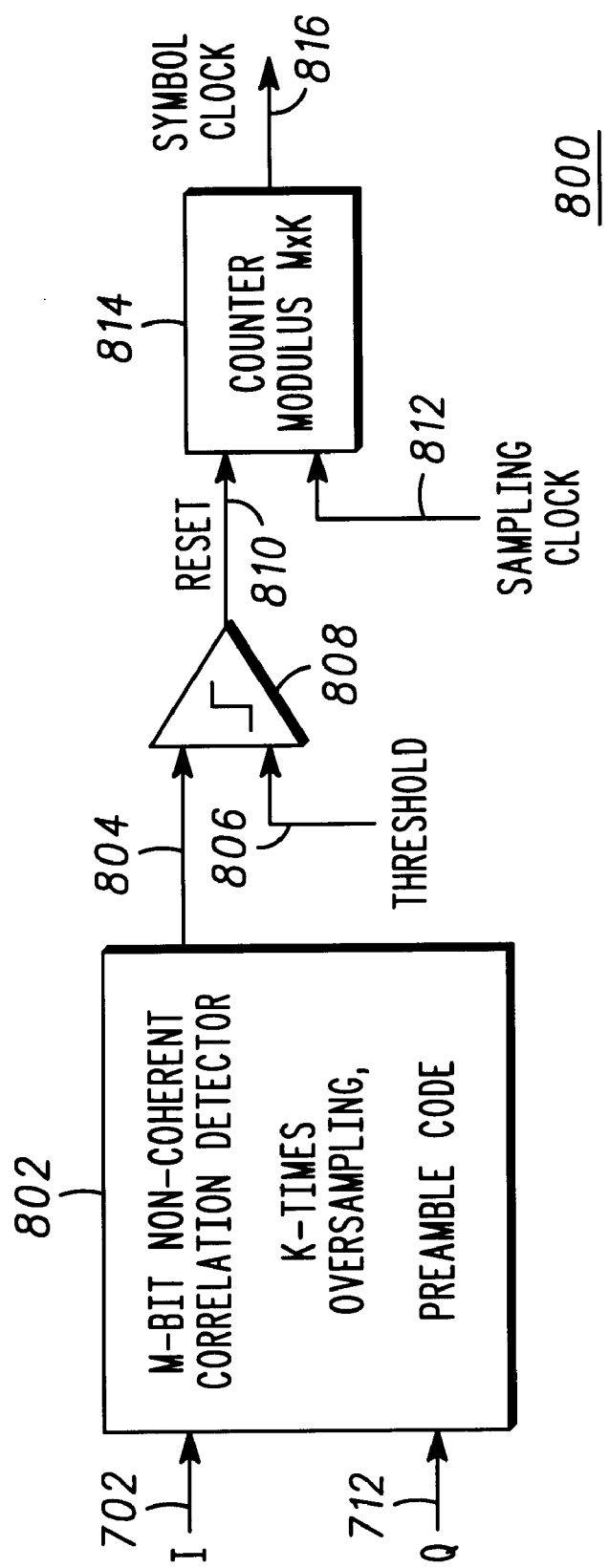
FIG. 8 is a block diagram of a timing recovery circuit of one embodiment of the present invention.

One application of the non-coherent correlation detector is in recovery of the symbol timing for the received signal. The preferred method of achieving this is through the use of the preamble. The symbol timing recovery circuit 800 is shown in FIG. 8. I-channel data 702 and Q-channel data 712 is input to an M-bit non-coherent correlation detector 802. The resulting output 804 is compared to a threshold level 806 in comparator 808. The output 810 from the comparator is used as a reset input to a resettable counter 814 with modulus K*M, and output high (one) for the reset condition only. In the absence of a reset input, the counter produces a high output once each K*M cycles of the sample clock 812. This corresponds to one output per symbol period. The output 816 of the counter is the symbol clock output for the block.

Synchronization of the symbol clock occurs when the output 804 of the non-coherent correlation detector 802 exceeds a threshold 806, causing the counter 814 to be reset. Because of the correlation property of the correlation detector, this occurs only when the input signal largely matches the preamble sequence in value and position. Thus, the symbol timing recovery circuit is able to identify the beginning/end of a preamble symbol.

Figure 9:
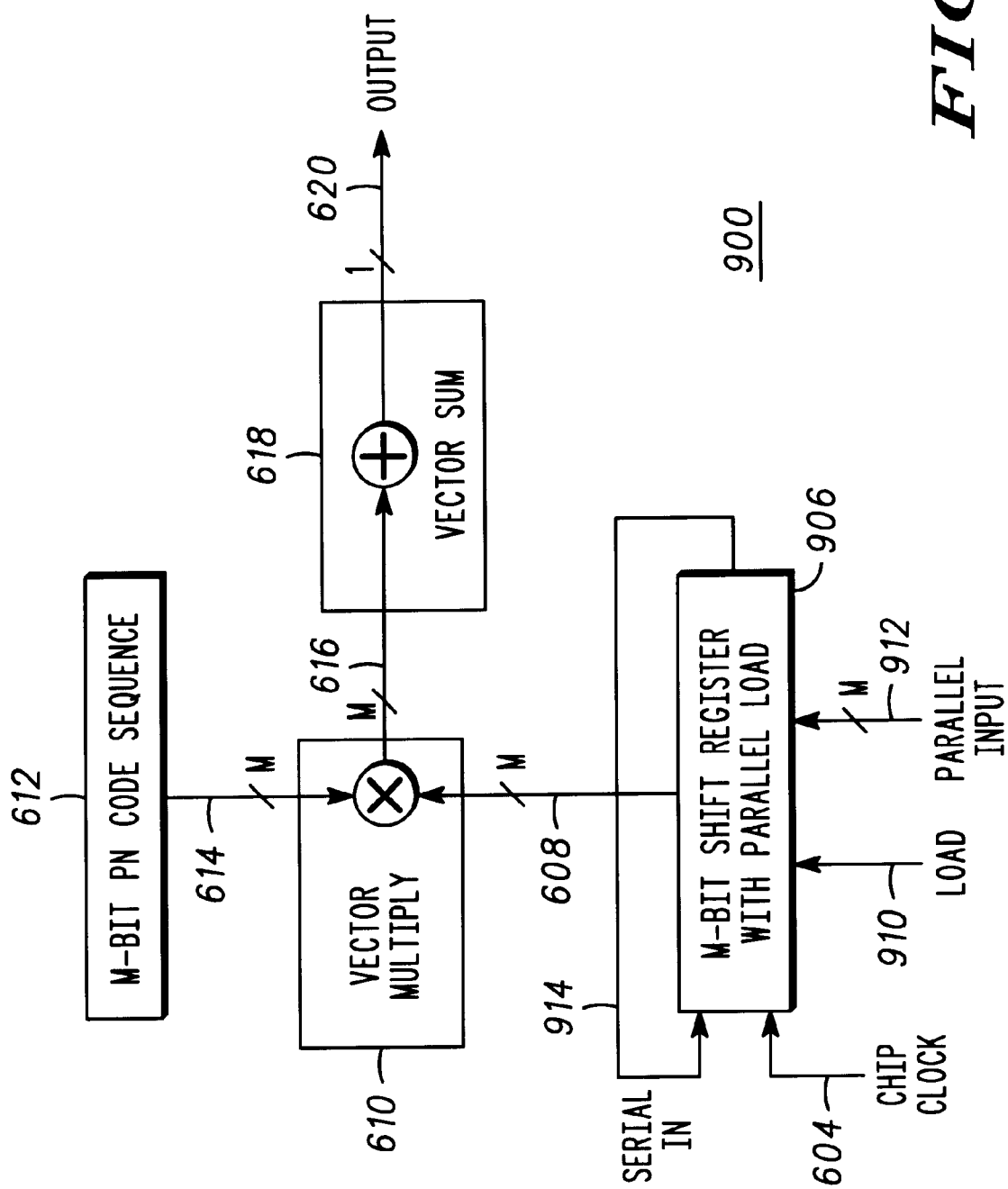
FIG. 9 is a block diagram of a modified correlator circuit with parallel load according to one embodiment of the present invention.

Actual data recovery is accomplished using a modified version of the correlator of FIG. 6. This is shown in FIG. 9. Comparing the two figures, the structure of in FIG. 9 has been modified to include a parallel load feature on the shift register 906. Data 912 is loaded as a M-bit parallel word in response to a high value on the load input 910. When load input 910 is low, the data is circulated through the shift register 906 as indicated by loop 914. The shift register 906 is controlled by chip clock 604. This structure can be built into a parallel load version of the non-coherent correlation detector in FIG. 7.

Figure 10:
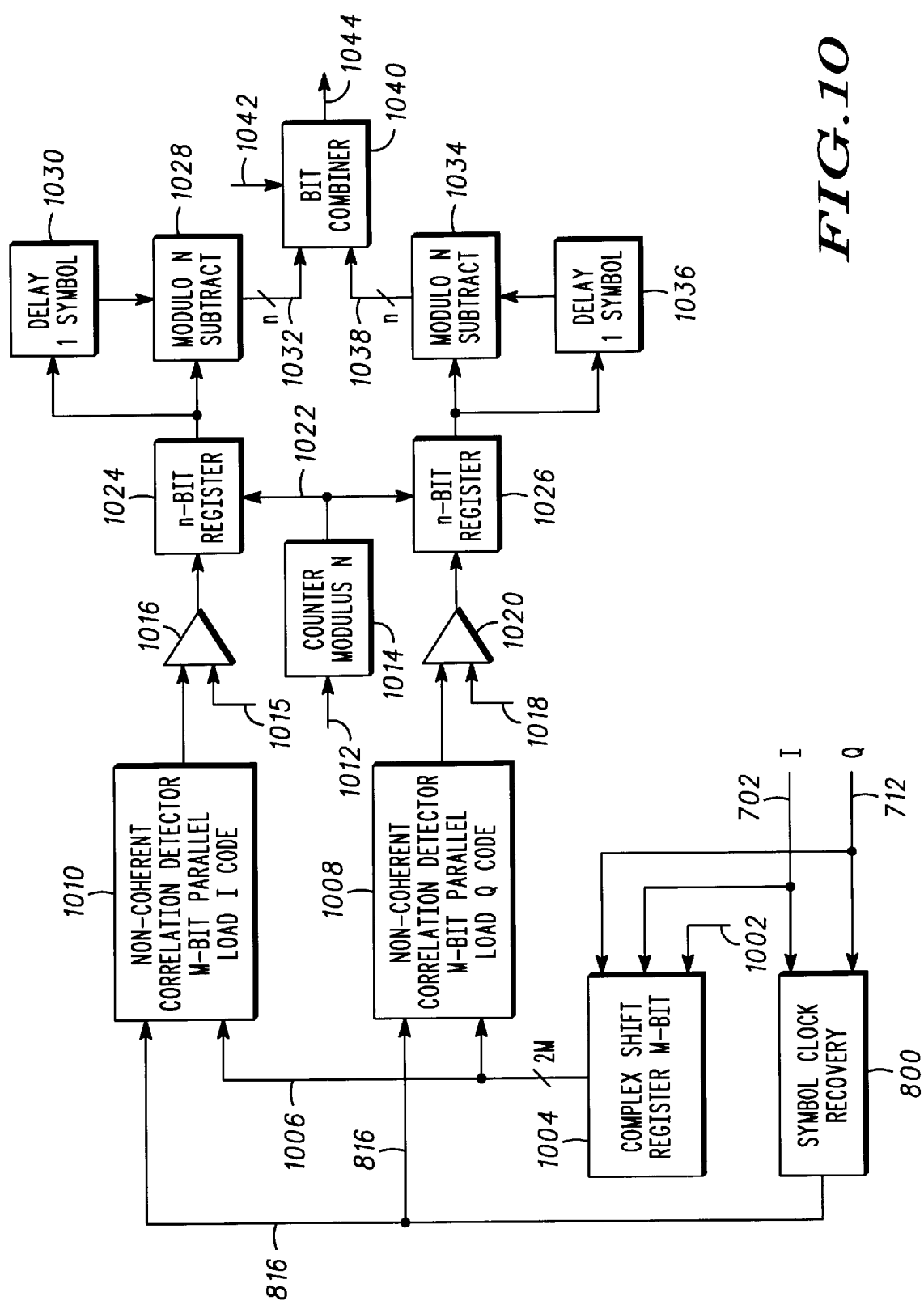
FIG. 10 is a block diagram of a data recovery circuit according to one embodiment of the present invention.

The non-coherent correlation detector with parallel load is used in data recovery as shown in FIG. 10. Although the invention can be applied to an arbitrary number of codes and code shifts, the embodiment shown in the figure uses two codes (I-code and Q-code) and N shifts per code. Referring to FIG. 10, I code data 702 and Q-code data 712 are provided to symbol clock recovery block 800 (shown in FIG. 8). The output from symbol clock recovery block is the symbol timing signal 816, that is coupled to the load inputs of the non-coherent correlation detectors 1008 and 1010. I code data 702 and Q-code data 712 is also provided to an M-bit [M-sample?] complex shift register 1004. On receipt of symbol timing signal 816, the circular registers in correlators 1008 and 1010 are loaded with the contents 1006 of the complex shift register 1004. This identifies the beginning of the symbol period.

It is important to correctly identify the beginning of each symbol period, as error in this step causes only part of the symbol to be stored and correlated. This reduces the noise immunity of the system. Note that because the data are differentially encoded, shifts in time of a few chips for data at the complex shift register input does not cause catastrophic failure.

Data recovery makes use of the parallel load correlation detectors 1008 and 1010 and a free-running clock with modulus n and clock rate N times the symbol rate. The correlators are clocked at the chip rate. The output from non-coherent correlation detector 1010 is compared to a threshold level 1015 in comparator 1016. Similarly, the output from non-coherent correlation detector 1008 is compared to a threshold level 1018 in comparator 1020. Shift clock 1012 is provided to a modulus N counter 1014 with output 1022. When correlation is achieved on a given correlator, the output of the non-coherent correlation detector exceeds a threshold, causing the instantaneous value 1022 of the free-running counter to be stored in n-bit register 1024 or 1026 as appropriate. The value stored in n-bit register 1024 is subtracted at 1028 from the value of the previous symbol period stored in delay unit 1030. This implements a differential decoding operation and recovers the original n-bit encoded data 1032. Similarly, the value stored in n-bit register 1026 is subtracted at 1034 from the value of the previous symbol period stored in delay unit 1036. This implements a differential decoding operation and recovers the original n-bit encoded data 1038. A 2*n to 1 bit combiner 1040 controlled by bit clock 1042 regenerates the original binary data stream 1044.

Note that for the case of 1 code sequence each for the I and Q channels, the two correlators 1008 and 1010 operate independently. If more than one code sequence is used on each channel, the codes assigned to a given channel cannot be treated independently. Additional logic is required to combine the correlation peaks for different code sequences on the same channel.

Figure 11:
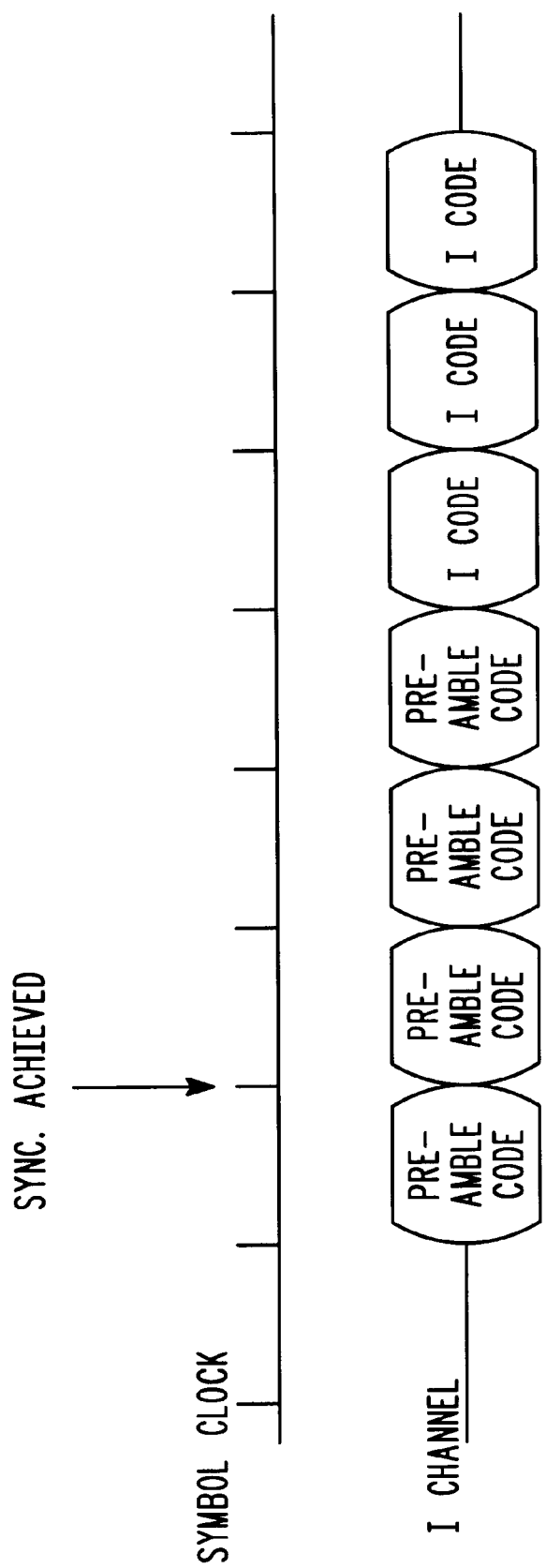
FIG. 11 is a timing diagram of receiver symbol waveforms produced by an exemplary system of the present invention.

The receiver signal timing waveform is shown in FIG. 11. In the figure, the symbol clock is free running in the absence of a preamble signal. When a preamble arrives on the I CHANNEL, the SYMBOL CLOCK synchronizes to the end of the preamble symbol (denoted by SYNC. ACHIEVED). When the preamble symbol transmission is completed, the symbol clock remains in synchronization, at least within the accuracy of the system clock in the receiver. For long transmissions, the preamble can be re-sent at appropriate intervals to maintain timing.

Figure 12:
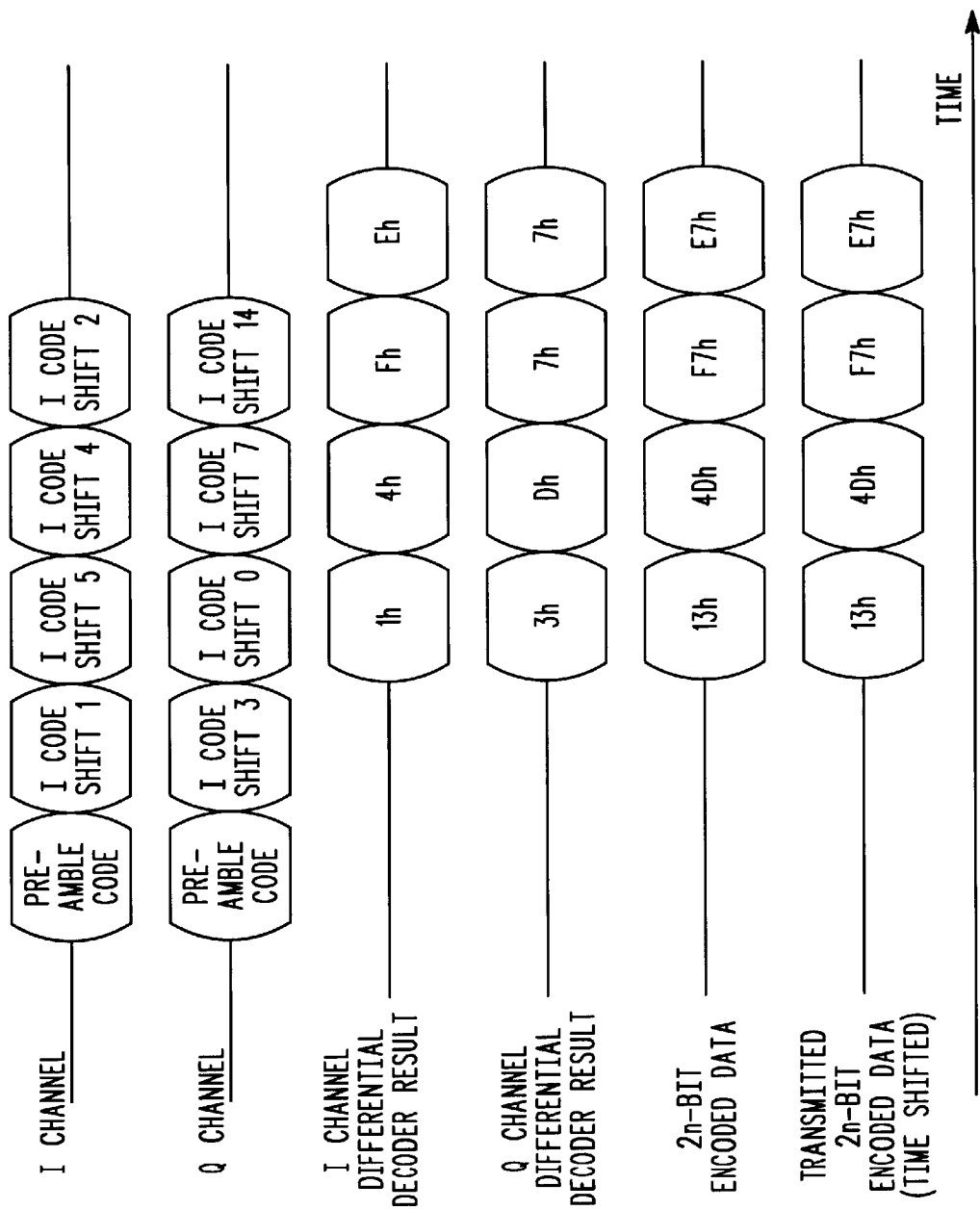
FIG. 12 is a timing diagram of selected receiver symbol waveforms produced by an exemplary system of the present invention.

In FIG. 12, selected waveforms are shown for the recovered data. This example matches the characteristics of the transmit example of FIG. 4. Note that recovered data, after differential decoding, matches the original transmitted data. The I-channel differential decoder result corresponds to the signal 1032 in FIG. 10. The Q-channel differential decoder result corresponds to the signal 1038 in FIG. 10. The transmitted 2n-bit encoded data (time-shifted) corresponds to the signal 1044 in FIG. 10.

A desired application of the receiver is in an RF communications system. As such, it is necessary to couple the invention with an antenna and means for converting the RF modulated signal into a baseband format, and provide the associated gain and filtering. Many such circuits are known in the art.

Figure 13:
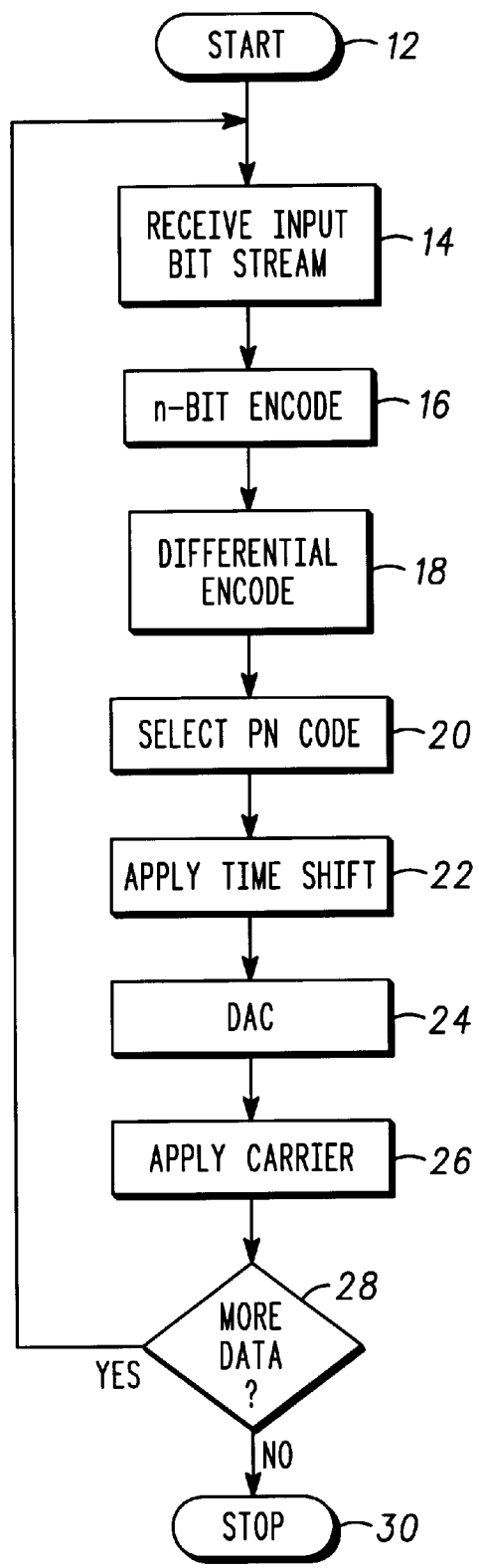
FIG. 13 is a flow chart of a method for transmitting communication signals according to one embodiment of the invention.

One embodiment of the encoding method of the current invention is shown in FIG. 13. Following start block 12, an input bit stream is received at block 14. The bit-stream is encoded into n-bit words at 16 and differential coding is applied at block 18. Preferably, the differential encoding uses modulo-N arithmetic. At block 20 selected bits of the differentially encoded symbol are used to select a pseudo-noise (PN) code at block 20. The remaining bits of the encoded symbol are used to select a time shift, which is applied to the selected PN code at block 22. The time-shifted PN code is converted to an analog signal at block 24 and is combined with the analog carrier signal at block 26. The combined signal is then amplified and transmitted. If more data is to be encoded and transmitted, as depicted by the positive branch from decision block 28, flow returns to block 14 to receive more data. If no more data is be encoded and transmitted, as depicted by the negative branch from decision block 28, the process terminates at block 30.

Figure 14:
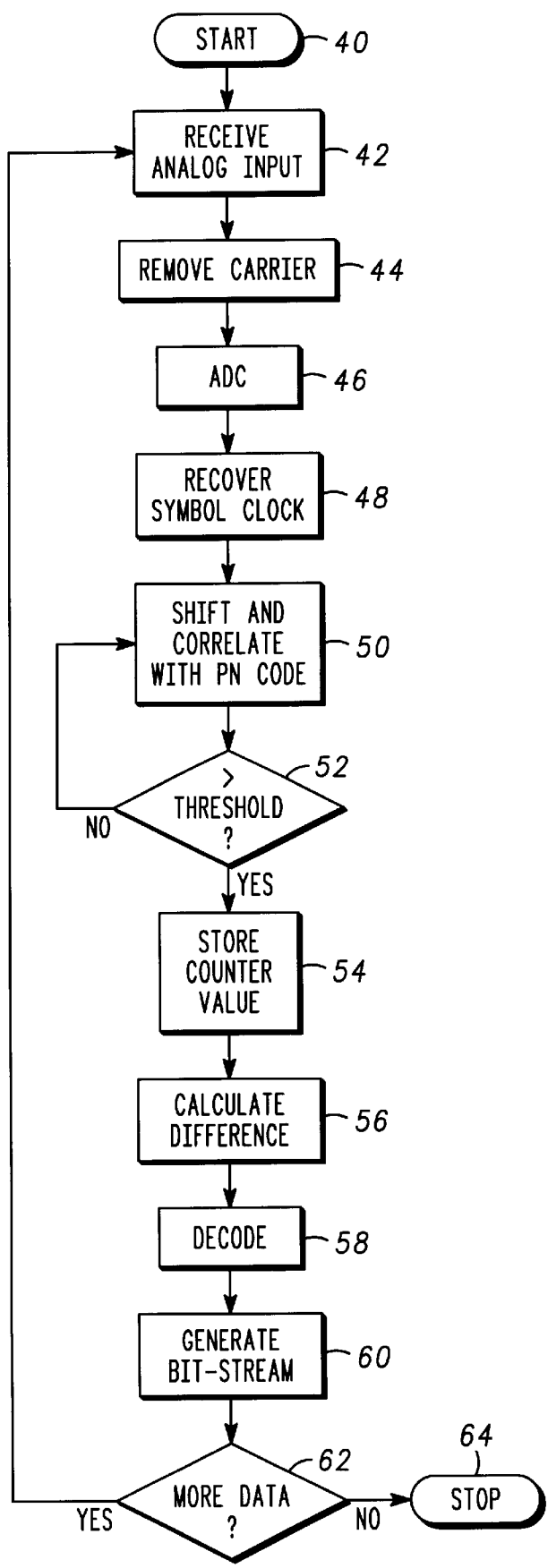
FIG. 14 is a flow chart of a method for receiving communication signals according to one embodiment of the invention.

An embodiment of a corresponding receiver is shown in FIG. 14. Following start block 40, an analog input signal is received at block 42. The carrier signal is removed at block 44 and the signal is digitized at analog to digital converter 46. At block 48 the symbol timing clock is recovered by correlating the received data with a preamble code. Successive data are then correlated with the PN codes at block 50. The resulting correlation is compared to a threshold value at decision block 52. If no correlation is found, as depicted by the negative branch from decision block 52, the received data is time-shifted and the correlation is computed again at block 50. If the correlation exceeds the threshold, as depicted by the positive branch from decision block 52, the value of a modulus N counter is stored at block 54. The difference between successive stored counter values is computed at block 56. The difference preferably uses modulo N arithmetic. The difference corresponds to the n-bit encoded value. The final bit-stream is recovered at 60 via a parallel to series converter. If more data is to be received and decoded, as depicted by the positive branch from decision block 62, flow returns to block 42. Otherwise, as depicted by the negative branch from decision block 62, the process terminates at block 64.

Those of ordinary skill in the art will recognize that the present invention has been described in terms of exemplary embodiments based upon use of a dual-channel system. However, the invention should not be so limited, since the present invention could be implemented in general as a multi-channel using hardware component such as special purpose hardware and/or dedicated processors, which are equivalents to the invention as described and claimed. Similarly, general purpose computers, microprocessor based computers, digital signal processors, micro-controllers, dedicated processors, custom circuits, ASICS and/or dedicated hard wired logic may be used to construct alternative equivalent embodiments of the present invention.

In the embodiment described above, the preamble is sent on both channels of the dual channel system. However, the preamble may be sent on only one channel in a multi-channel system. For modulation schemes such as offset QPSK, this could prevent multiple correlation peaks on the preamble signal. A different preamble sequence may be used in each channel of a multi-channel system allowing the receiver to differentiate among the various channels using the preamble.

Mapping schemes other than modulo-N subtraction, or the difference between adjacent bits could be used to differentially encode data bits for mapping to code position. One element of the present invention is the use of mapping based on the difference between values applied to the same channel.

Simple threshold detection may not be adequate to detect the correlation peak of the preamble signal in the presence of multi-path or a fading channel. More sophisticated methods, known in the art, could be applied to this problem.

The invention as presented can be modified by adding the differential chip coding and decoding techniques described in U.S. patent application Ser. No. 09/716,837.

It may be desirable in some applications to assign channels to the transmitted data by a method other than MS and LS nibbles. Deterministic sources of error between the transmitted channels may lead to a different BER for MS and LS nibbles, which may be undesirable. Alternative methods include alternating the nibbles to each channel in some periodic or deterministic fashion, and assigning bits to each channel in a deterministic way (e.g., bits 0, 2, 4, 8 to I channel, bits 1, 3, 5, 7 to Q channel).

While the invention has been presented in terms of orthogonal signals, non-orthogonal signal sets could be employed.

Different preamble sequences could be sent on I and Q channels to aid in identifying I and Q channels.

If large packets are used, the inclusion of additional instances of the preamble sequence (mid-amble) could aid in maintaining symbol synchronization.

Other approximations to RMS could alternatively be used for magnitude detection. Alternatively, coherent receive schemes could be used.

Many other variations will also be evident to those of ordinary skill in the art.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A communication system comprising:
   a transmitter for generating a transmitted modulated signal, said transmitter comprising:
      a differential encoder for receiving an input data symbol and producing a differentially encoded symbol;
      a memory for storing a code sequence;
      a shifting means for time-shifting said code sequence by a time-shift, said time-shift being determined by said differentially encoded symbol, said shifting means being coupled to said memory and generating said transmitted modulated signal; and
   a receiver for decoding a received modulated signal, said receiver comprising:
      a shift register for receiving the received modulated signal and generating time-shifted versions thereof;
      a correlator for determining the correlation between the time-shifted received modulated signals and a code sequence;
      a means for determining a time-shift that maximizes the correlation between the time-shifted received modulated signals and the code sequence; and
      a differential decoder for determining an output data symbol as the difference between time-shifts that maximize the correlation between successive time-shifted received modulated signals and the code sequence; and
      wherein said input data symbol takes one of N values and said differential encoder comprises a delay unit for storing a previous differentially encoded symbol and a modulo-N summer for summing the input data symbol with the previous differentially encoded symbol.

2. A communication system in accordance with claim 1, wherein said transmitter further comprises a means for converting an input bit-stream into a sequence of input data symbols and said receiver further comprises a means for converting said output data symbol into an output bit-stream.

3. A communication system in accordance with claim 1, wherein said receiver further comprises:
   a radio receiver for receiving a radio signal having a carrier signal and generating an input analog signal;
   means for removing said carrier signal from said input analog signal;
   analog to digital converter for converting said input analog signal into said received modulated signal.

4. A communication system comprising:
   a transmitter for generating a transmitted modulated signal, said transmitter comprising:
      a differential encoder for receiving an input data symbol and producing a differentially encoded symbol;
      a memory for storing a code sequence;
      a shifting means for time-shifting said code sequence by a time-shift, said time-shift being determined by said differentially encoded symbol, said shifting means being coupled to said memory and generating said transmitted modulated signal; and
   a receiver for decoding a received modulated signal, said receiver comprising:
      a shift register for receiving the received modulated signal and generating time-shifted versions thereof;
      a correlator for determining the correlation between the time-shifted received modulated signals and a code sequence;
      a means for determining a time-shift that maximizes the correlation between the time-shifted received modulated signals and the code sequence; and
      a differential decoder for determining an output data symbol as the difference between time-shifts that maximize the correlation between successive time-shifted received modulated signals and the code sequence;

wherein said transmitter further comprises:
a digital to analog converter for converting said time-shifted code sequence into an analog signal;
a radio frequency signal generator for generating a radio frequency signal;
a multiplier for multiplying said radio frequency signal and said analog signal to produce an output signal;
a power amplifier for amplifying said output signal to produce an amplified output signal; and
a radio transmitter for generating a radio signal in response to said amplified output signal.

5. A communication system comprising:
a transmitter for generating a transmitted modulated signal, said transmitter comprising:
a differential encoder for receiving an input data symbol and producing a differentially encoded symbol;
a memory for storing a code sequence;
a shifting means for time-shifting said code sequence by a time-shift, said time-shift being determined by said differentially encoded symbol, said shifting means being coupled to said memory and generating said transmitted modulated signal and wherein said input data symbol has 2n-bits wherein n-bits of the of the input data symbol are used to determine the time-shift for a first code sequence and the remaining n-bits of the of the input data symbol are used to determine the time-shift for a second code sequence; and
a receiver for decoding a received modulated signal, said receiver comprising:
a shift register for receiving the received modulated signal and generating time-shifted versions thereof;
a correlator for determining the correlation between the time-shifted received modulated signals and a code sequence;
a means for determining a time-shift that maximizes the correlation between the time-shifted received modulated signals and the code sequence;
a differential decoder for determining an output data symbol as the difference between time-shifts that maximize the correlation between successive time-shifted received modulated signals and the code sequence;

wherein said transmitter further comprises:
a first digital to analog converter for converting said first time-shifted code sequence into a first analog signal;
a second digital to analog converter for converting said second time-shifted code sequence into a second analog signal;
a radio frequency signal generator for generating an in-phase radio frequency signal;
a phase-shifter responsive to said in-phase radio frequency signal and generating a quadrature radio frequency signal;
a first multiplier for multiplying said in-phase radio frequency signal and first analog signal to produce a first output signal;
a second multiplier for multiplying said quadrature radio frequency signal and second analog signal to produce a second output signal;
a summer for summing said first and second output signals to produce a combined output signal;
a power amplifier for amplifying said combined output signal to produce an amplified output signal; and
a radio transmitter for generating a radio signal in response to said amplified output signal.

6. A communication system in accordance with claim 5, wherein said correlator is an in-phase correlator for determining the correlation between the time-shifted received modulated signals and said first code sequence and said receiver further comprises a quadrature correlator for determining the correlation between the time-shifted received modulated signals and said second code sequence.

7. A communication system comprising:
a transmitter for generating a transmitted modulated signal, said transmitter comprising:
a differential encoder for receiving an input data symbol and producing a differentially encoded symbol;
a memory for storing a code sequence;
a shifting means for time-shifting said code sequence by a time-shift, said time-shift being determined by said differentially encoded symbol, said shifting means being coupled to said memory and generating said transmitted modulated signal; and a receiver for decoding a received modulated signal, said receiver comprising:
a shift register for receiving the received modulated signal and generating time-shifted versions thereof;
a correlator for determining the correlation between the time-shifted received modulated signals and a code sequence;
a means for determining a time-shift that maximizes the correlation between the time-shifted received modulated signals and the code sequence;
a differential decoder for determining an output data symbol as the difference between time-shifts that maximize the correlation between successive time-shifted received modulated signals and the code sequence; and
wherein said means for determining the time-shift that maximizes the correlation between the time-shifted received modulated signals and the code sequence comprises:
a modulo N counter;
a comparator for comparing the correlation between the time-shifted received modulated signals and a code sequence with a threshold level; and
a memory for storing the value of the modulus N counter when the correlation between the time-shifted received modulated signals and a code sequence exceeds the threshold level.

8. A communication system comprising:
a transmitter for generating a transmitted modulated signal, said transmitter comprising:
a differential encoder for receiving an input data symbol and producing a differentially encoded symbol;
a memory for storing a code sequence;
a shifting means for time-shifting said code sequence by a time-shift, said time-shift being determined by said differentially encoded symbol, said shifting means being coupled to said memory and generating said transmitted modulated signal; and a receiver for decoding a received modulated signal, said receiver comprising:
a shift register for receiving the received modulated signal and generating time-shifted versions thereof;

a correlator for determining the correlation between the time-shifted received modulated signals and a code sequence;

a means for determining a time-shift that maximizes the correlation between the time-shifted received modulated signals and the code sequence;

a differential decoder for determining an output data symbol as the difference between time-shifts that maximize the correlation between successive time-shifted received modulated signals and the code sequence; and wherein said input data symbol takes one of N values and said differential decoder comprises:

a delay unit for storing a time-shift that maximize the correlation between the previous time-shifted received modulated signals and the code sequence; and a modulo-N subtractor for subtracting the time-shift that maximizes the correlation between the previous time-shifted received modulated signals and the code sequence from the time-shift that maximizes the correlation between the current time-shifted received modulated signals and the code sequence.

9. A communication system comprising:

a transmitter for receiving a series of input data symbols and generating a transmitted modulated signal, said transmitter comprising:

a first memory for storing a code sequence;

a second memory for storing a preamble sequence;

a shifting means coupled to said first memory for producing a series of time-shifted code sequences, the time-shift of each time-shifted code sequence of the series of time-shifted code sequences being determined by a corresponding input data symbol from the series of input data symbols; and means for combining one or more preamble sequences with the series of time-shifted code sequences series to generate said transmitted modulated signal, said means for combining being coupled to said shifting means and said second memory;

a receiver for decoding a received modulated signal, said receiver comprising:

a first correlator for determining the correlation between the received modulated signals and said preamble sequence and determining a symbol clock therefrom;

a shift register for receiving the received modulated signal and generating time-shifted versions thereof;

a second correlator, responsive to said system clock, for determining the correlation between the received modulated signals and a code sequence; and means for determining the time-shift that maximizes the correlation between the received modulated signals and the code sequence and determining an output data symbol therefrom.

10. A communication system in accordance with claim 9, wherein said transmitter further comprises a means for converting an input bit-stream into a sequence of input data symbols and said receiver further comprises a means for converting said output data symbol into an output bit-stream.

11. A communication system in accordance with claim 9, wherein said first correlator is over-sampled so as to obtain a more accurate symbol clock.

12. A communication system in accordance with claim 9, further comprising:

a differential encoder for encoding said series of input data symbols; and a differential decoder for decoding said output data symbol.

13. A method for generating a modulation signal from a series of input data symbols, each symbol having of N values, said method comprising:

differentially encoding each input data symbol of said series of input data symbols to obtain a differentially encoded input data symbol, wherein said differentially encoding comprises performing a modulo-N sum of the input data symbol with a previous differentially encoded input data symbol;

selecting a code sequence from a set of $2^r$ code sequences, where r is an integer, according to r-bits of the differentially encoded input data symbol, each code sequence having M bits, where M is an integer greater than or equal to N; and time-shifting the selected code sequence by an amount determined by the remaining bits of the differentially encoded input symbol to obtain M bits of the modulation signal.

14. A method for generating a modulation signal in accordance with claim 13, further comprising converting an input bit-stream into said series input data symbols.

15. A method for generating a modulation signal from a series of input data symbols, each symbol having of N values, said method comprising:

differentially encoding each input data symbol of said series of input data symbols to obtain a differentially encoded input data symbol;

selecting a code sequence from a set of $2^r$ code sequences, where r is an integer, according to r-bits of the differentially encoded input data symbol, each code sequence having M bits, where M is an integer greater than or equal to N; and time-shifting the selected code sequence by an amount determined by the remaining bits of the differentially encoded input symbol to obtain M bits of the modulation signal, wherein said time-shifting comprises:

storing a code sequence in an M-bit shift register;

selecting a bit from the M-bit shift register according to said differentially encoded symbol; and for each of M clock cycles:

reading the selected bit from the M-bit shift register; and causing a circular shift of the contents of the M-bit shift register by one bit.

16. A method for generating a modulation signal from a series of input data symbols, each symbol having of N values, said method comprising:

generating a preamble sequence;

differentially encoding each input data symbol of said series of input data symbols to obtain a differentially encoded input data symbol by performing a modulo-N sum of the input data symbol with a previous differentially encoded data symbol; and for each differentially encoded input data symbol of the series of differentially encoded input data symbols:

selecting a code sequence from a set of $2^r$ code sequences, where r is an integer, according to r-bits of the input data symbol, each code sequence having M bits, where M is an integer greater than or equal to N; and time-shifting the selected code sequence by an amount determined by the remaining bits of the differentially encoded input symbol to obtain M bits of the modulation signal.

* * * * *